(12) United States Patent
Blanton et al.

(10) Patent No.: US 11,956,493 B2
(45) Date of Patent: Apr. 9, 2024

(54) NETWORKING MODULES FOR DISPLAY SYSTEMS

(71) Applicant: Blonder Tongue Laboratories, Inc., Old Bridge, NJ (US)

(72) Inventors: Joshua T. Blanton, Milford, OH (US); Robert J. Palle, Freehold, NJ (US); Nezam T. Nikoo, Holmdel, NJ (US)

(73) Assignee: Blonder Tongue Laboratories, Inc., Old Bridge, NJ (US)

( * ) Notice: Subject to any disclaimer, the term of this patent is extended or adjusted under 35 U.S.C. 154(b) by 429 days.

(21) Appl. No.: 17/064,784

(22) Filed: Oct. 7, 2020

(65) Prior Publication Data

US 2021/0037280 A1 Feb. 4, 2021

Related U.S. Application Data

(60) Division of application No. 16/580,180, filed on Sep. 24, 2019, now Pat. No. 10,805,660, which is a
(Continued)

(51) Int. Cl.
*H04N 7/173* (2011.01)
*H04L 12/28* (2006.01)
(Continued)

(52) U.S. Cl.
CPC ..... *H04N 21/4182* (2013.01); *H04L 12/2801* (2013.01); *H04L 27/144* (2013.01);
(Continued)

(58) Field of Classification Search
CPC ......... H04N 21/4182; H04N 21/43615; H04N 21/6168; H04N 7/106; H04N 7/10;
(Continued)

(56) References Cited

U.S. PATENT DOCUMENTS 8,438,607 B2  5/2013  Cholas et al.
8,498,294 B1  7/2013  Monk et al.
(Continued)

OTHER PUBLICATIONS

Search report and Written opinion, PCT/US2017/055342, dated Dec. 26, 2017.

*Primary Examiner* — Nicholas T Corbo
*Assistant Examiner* — Sahar Aqil Riaz
(74) *Attorney, Agent, or Firm* — Woodard, Emhardt, Henry, Reeves & Wagner, LLP

(57) ABSTRACT

The disclosure relates to modem and router modules for use with digital display systems, including televisions. A modem module is configurable to attach to a set-top box, a set-back box, directly to a digital display, or may even be integrated into display equipment. Router functions and ports can be integrated into the module to provide for networking of additional devices in proximity to the module and/or display, using either or both wired and wireless access technologies. Systems including the module convert power to the appropriate forms for delivery to the different devices, hardware, and components associated with the module. The modem and routing functions are configurable to provide separate security domains to isolate or direct traffic among the various networked devices.

20 Claims, 6 Drawing Sheets

Related U.S. Application Data continuation of application No. PCT/US2017/055342, filed on Oct. 5, 2017.

(51) Int. Cl.
*H04L 27/144* (2006.01)
*H04N 21/418* (2011.01)
*H04W 88/08* (2009.01)
*H04L 49/00* (2022.01)

(52) U.S. Cl.
CPC ............ *H04W 88/08* (2013.01); *H04L 49/00* (2013.01); *H04L 49/3072* (2013.01)

(58) Field of Classification Search
CPC ... H04L 12/2801; H04L 27/144; H04L 49/00; H04L 49/3072; H04L 12/2898; H04L 12/4641; H04W 88/08
USPC ........................................................ 725/110
See application file for complete search history.

(56) References Cited

U.S. PATENT DOCUMENTS

| | | |
|---|---|---|
| 9,743,383 B1 | 8/2017 | Norin |
| 2003/0046359 A1 | 3/2003 | Betz et al. |
| 2003/0070181 A1 | 4/2003 | Holm |
| 2003/0095385 A1* | 5/2003 | Holliday ............... H04N 7/106 361/728 |
| 2004/0172658 A1 | 9/2004 | Rakib et al. |
| 2004/0244049 A1 | 12/2004 | Hahin et al. |
| 2007/0143806 A1 | 6/2007 | Pan |
| 2007/0240232 A1 | 10/2007 | Pino et al. |
| 2007/0250872 A1* | 10/2007 | Dua ..................... H04W 12/06 725/63 |
| 2008/0076354 A1 | 3/2008 | Rofougaran |
| 2008/0092188 A1 | 4/2008 | Rofougaran |
| 2008/0098450 A1 | 4/2008 | Wu et al. |
| 2008/0120667 A1 | 5/2008 | Zaltsman |
| 2008/0120675 A1 | 5/2008 | Morad et al. |
| 2008/0155630 A1 | 6/2008 | Oosawa |
| 2008/0266402 A1 | 10/2008 | Wu et al. |
| 2009/0036159 A1 | 2/2009 | Chen |
| 2010/0017833 A1 | 1/2010 | Abramson et al. |
| 2010/0079679 A1* | 4/2010 | Kulczyckyj .......... H04N 21/426 348/730 |
| 2010/0097528 A1* | 4/2010 | Seo ........................ H04N 7/106 348/731 |
| 2010/0157817 A1 | 6/2010 | Mergler et al. |
| 2010/0169279 A1 | 7/2010 | Loi et al. |
| 2011/0078749 A1* | 3/2011 | Wieck .................... H01Q 21/28 348/731 |
| 2011/0182180 A1* | 7/2011 | Riddle ................ H04L 41/0896 370/230 |
| 2011/0310297 A1* | 12/2011 | Gawel ..................... H04L 41/22 348/E7.001 |
| 2012/0016951 A1 | 1/2012 | Li et al. |
| 2013/0073977 A1* | 3/2013 | Foote ........................ G06F 3/01 715/739 |
| 2013/0215589 A1 | 8/2013 | Nowak et al. |
| 2014/0059632 A1 | 2/2014 | McMullin et al. |
| 2014/0181883 A1 | 6/2014 | Schroeder |
| 2014/0237509 A1 | 8/2014 | Bishop et al. |
| 2015/0026750 A1* | 1/2015 | Wachob .................. H04N 7/22 725/127 |
| 2015/0095935 A1 | 4/2015 | Laksono |
| 2015/0237658 A1 | 8/2015 | Fontaine et al. |
| 2016/0150272 A1 | 5/2016 | Markley et al. |
| 2016/0212473 A1 | 7/2016 | Zhuang et al. |
| 2016/0227157 A1* | 8/2016 | Zhong .................. G09G 3/3406 |
| 2016/0269775 A1 | 9/2016 | Cholas et al. |
| 2016/0309043 A1 | 10/2016 | Hicks, III |
| 2016/0329632 A1 | 11/2016 | Caratelli |
| 2016/0330200 A1 | 11/2016 | Ansari et al. |
| 2017/0070395 A1 | 3/2017 | Ansari et al. |
| 2019/0363753 A1* | 11/2019 | Alkan ....................... H04B 3/42 |
| 2020/0252375 A1* | 8/2020 | Chen .................... H04L 63/0272 |

* cited by examiner

NETWORKING MODULES FOR DISPLAY SYSTEMS

CROSS REFERENCE TO RELATED APPLICATIONS

This application is a divisional application of Ser. No. 16/580,180, filed Sep. 24, 2019, which is a continuation of International Patent Application No. PCT/US2017/055342, filed Oct. 5, 2017, both of which are hereby incorporated by reference.

BACKGROUND

Content delivery networks are now capable of delivering a variety of different service categories (e.g., video, Internet, or telephone) over a single transmission medium by a single network operator, and increasingly customers are bundling these services. By the time a signal is received in a customer premises, typically several different devices are used to handle and process the signals and data received, depending on the types of signals that are used deeper into the in-premises network.

For example, FIG. 1 is a diagram illustrating an exemplary services delivery model known in the prior art. External network(s) 100 are connected to premises 110 by transmission lines 120. Within the premises 110, various devices can connect to transmission lines 120. For example, a modem 131, telephone 132, and audiovisual display 133 and/or set-top box 135 may be connected. These devices may be serviced by one or more than one transmission line type, for example, coaxial cable and telephone wiring. With regard to Internet and general local area network services, the modem 131 may be further connected to a router 140 that provides additional access to various other networked devices 150 and 150'. To give a few examples, networked device may be a desktop computer, laptop computer, mobile device, "smart" television or display, digital video recorder (DVR), digital assistant, game console, home appliances and/or home automation equipment, security systems, or various other devices which are capable of communicating using IP-based network protocols. Router 140 may include or be connected to a wireless access point (WAP) 170, that can alternatively service or supplement service to networked devices 150. As used herein, the term "router" encompasses any switch configured to deliver data to the specific port(s) selected based on characteristics of the data, including IP routing devices, Ethernet switches, packet-switching systems.

Although some prior art gateway devices combine modem and routing functions, the provision of broadcast audiovisual programming (such as television signals) is not typically integrated into such gateway devices. Many commercial networks also require set-top box or set-back boxes for delivery of their services, which limits the amount of integration that can be achieved, particularly when multiple audiovisual displays are used within one premises. Existing integrated systems are directed toward providing or sharing content and/or data among several networked devices. However, there is a need for various networked devices to have isolated data paths to the external networks to provide for and maintain security and service levels to the various devices. Additional complications can arise because a single service provider may employ multiple delivery networks simultaneously, such as a legacy network in combination with a fiber-based IP (internet protocol) system. The expense and maintenance of equipment for each of these functions can be burdensome. This multiplication of devices is compounded for certain enterprise customers that centrally manage services provided for many end-user points, such as hotels, educational institutions, multifamily housing, commercial buildings, hospitals, airports, or other multiple-dwelling units. For example, in FIG. 1, premises 110 can be all or a part of a proximate physical facility, for example a home (or part of a home), a hotel or hotel room, or buildings on a campus. In addition to the number of devices required and potential for failure, configuration, or compatibility issues, the multiplication of cabling to interconnect the various devices, as well as proliferation of distinct power requirements, complicates installation, maintenance, and power consumption.

BRIEF SUMMARY OF THE INVENTION

The present disclosure provides for network integration of audiovisual devices in various ways. A modem module may connect to any of a television, a display, a set-top box, or a set-back box by way of an interface adapted to provide both power transfer and data communications with the connected audiovisual device. The module includes a networking port that supports connectivity to additional user devices, and a router to send traffic to the networking port or the audiovisual device. The router can isolate the traffic destined to the various devices serviced by the module to provide for enhanced security and reduce network consumption. The module may be adapted to convert power to different forms appropriate for supply of either internal components or for delivery to external devices, such as a wireless access point, and may supply the external power through one or more networking ports. In one embodiment, the module is adapted for use with cable systems, such that the modem is a cable modem using DOCSIS standards. Television programming may be routed to a RF tuner system on the audiovisual device while data services (e.g., streaming services, interactive services, browsing and general Internet traffic) can be provided through the module's interface or networking port(s). Benefits provided include the extension of data networking services throughout a facility using existing coaxial wiring.

Router, display, and/or modem functions can be implemented in an inventive integrated system. Such a system may share a common power supply and may be physically and electrically integrated within the same enclosure to avoid additional wiring between components. The common power supply may be extended to additional devices through one or more networking ports, again with the consolidation of communications and power supply wiring into a single cable. The disclosure provides for integrated systems lacking a modem function, such that communications with external network(s) between an integrated display and router are provided over a networking connection rather than a modulated RF signal. However, options provided include the conversion of network information to modulated RF signals.

The disclosure also relates to data partitioning and routing in networking modules for audiovisual systems. Data received from an external network may have logical data partitioning. A networking module may maintain the logical partitioning to isolate each device or port serviced by the module. Examples include the separation of audiovisual content with limited, device-specific viewing authorizations from data associated with devices that are not within that authorization. Embodiments provide for the conversion of one security domain protocol or format to another, either within the module or at a separate device optionally under common management. The binding of security domains to physical ports or connections can be managed with a configuration file or administrative controls received from the external network. Security domains may be nested to provide for further data portioning in a premises network, for example by partitioning traffic destined for different modules, each of which in turn may maintain partitions bound to its physical connections.

DETAILED DESCRIPTION

1. Structural and Operational Overview

Figure 2:
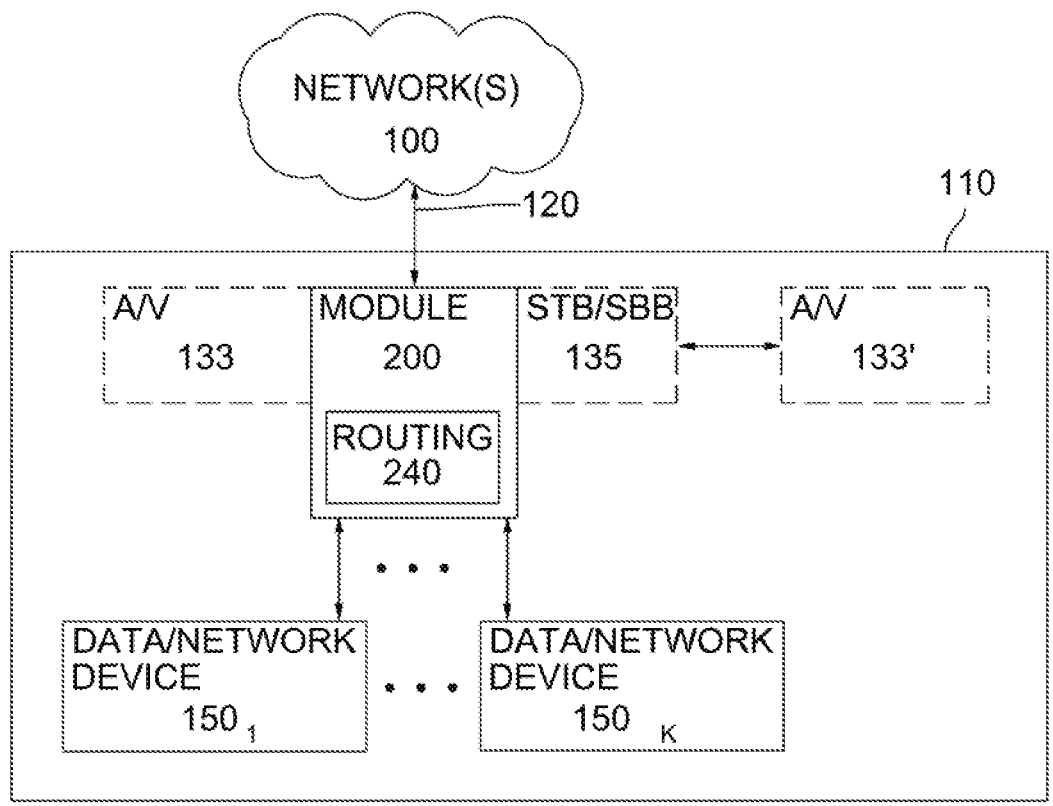
FIG. 2 is a block diagram of inventive modules in relation to in-premises networked devices.

Referring to FIG. 2, a modem module 200 can be connected to premises wiring 120. Premises wiring 120 may be any data delivery medium, including but not limited to coaxial cable, twisted pair telephone lines, Ethernet, fiberoptic, and/or small form-factor pluggable (SFP). As one example, premises wiring 120 is coaxial cable, and may be serviced by a hybrid-fiber-coax network such as the common commercial and residential cable networks in service today. Many of the implementations referred to herein relate to utilizing a coaxial network, but the disclosures of the present application are not limited to coaxial delivery. As further discussed below, modem modules 200 may also be implemented in a purely IP-based delivery system and/or without any coaxial cabling. One advantage provided by the modem module 200 is the ability to use existing wiring for additional or enhanced data services without the need for costly and disruptive retrofitting of facilities.

Figure 1:
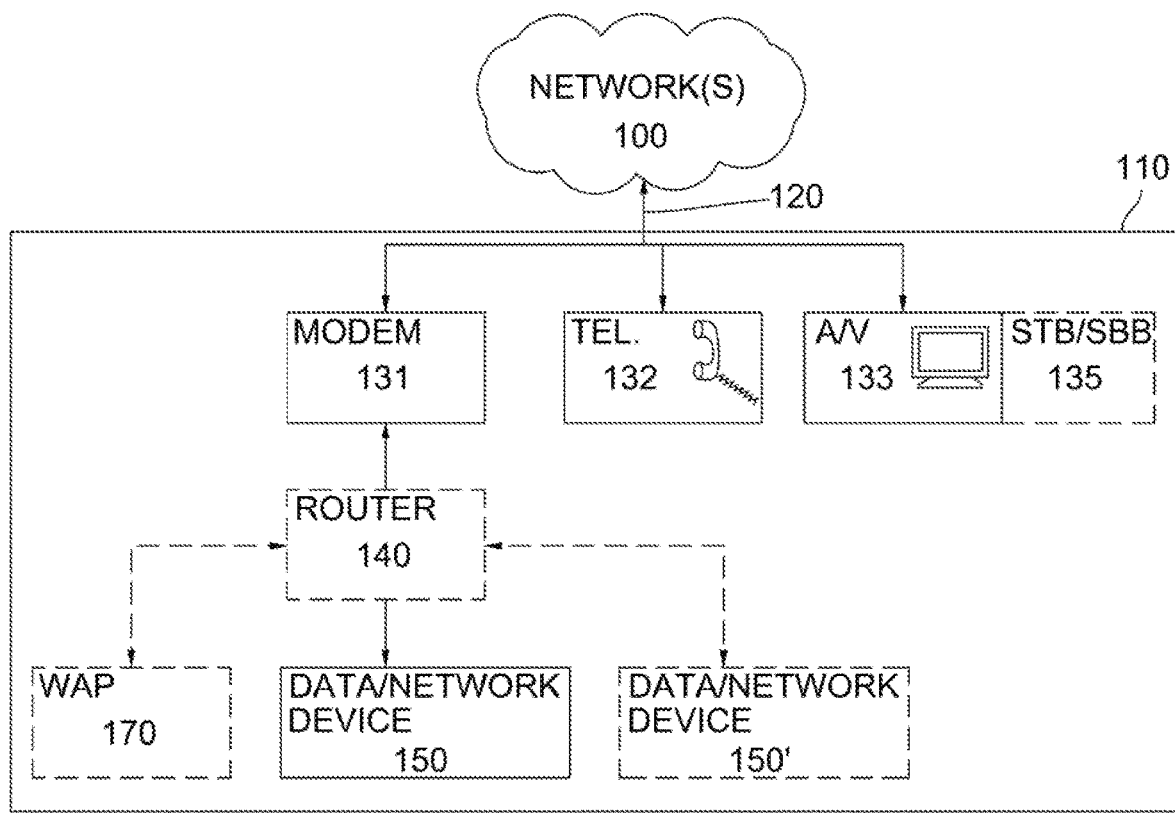
FIG. 1 is a block diagram of exemplary in-premises networked devices implemented in the prior art.
Figure 4A:
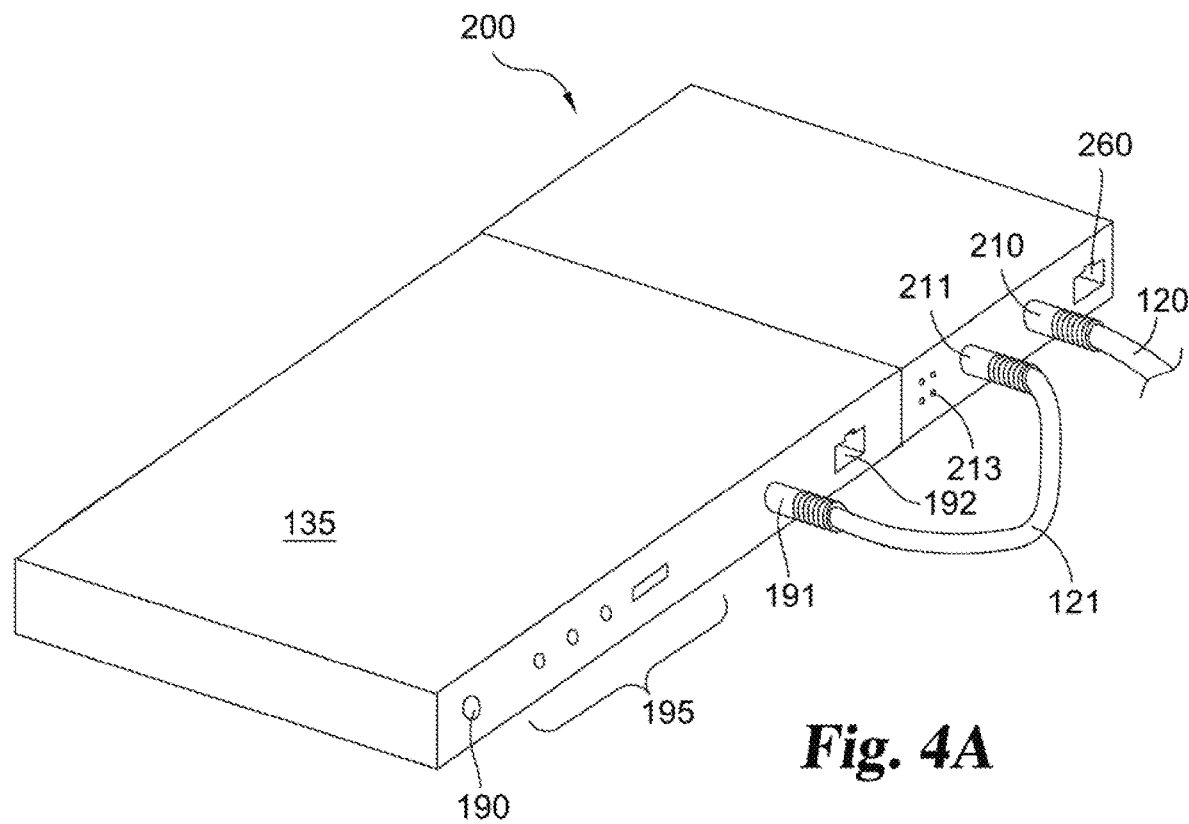
FIG. 4A is a perspective view of an inventive module of FIG. 2 configured for and attached to a side of a set-top or set-back box.
Figure 4B:
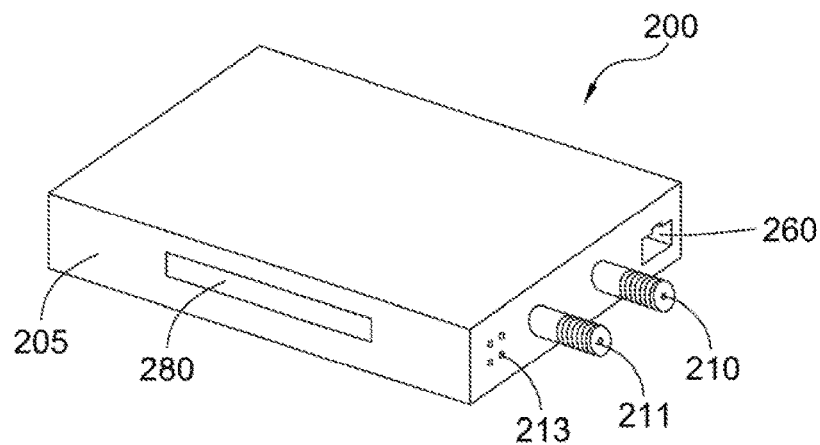
FIG. 4B is a perspective view of the inventive module of FIG. 4A, shown separated from set-top or set-back box.

Modem module 200 can integrate and/or replace functions of several of the networked devices depicted in FIG. 1. For example, modem module 200 is optionally equipped with routing and switching functions 240 to establish and/or increase access to an in-premises network. Data handling relating to the various devices connected to the in-premises network is further discussed below. The modem module 200 can be implemented in multiple formats to interface with various audiovisual devices. For example, in some embodiments, module 200 can be physically and electronically linked to a set-top box or set-back box (STB/SBB) 135. Module 200 may optionally be linked directly to a display device 133 without the use of an STB/SBB 135. These and other physical formats are discussed in more detail in connection with FIGS. 4-6, below. Regardless of the format of module 200, routing function may be implemented to provide IP data communications with display 133 and/or STB/SBB 135 or other forms of audiovisual devices.

In some embodiments, display 133 is a high-definition digital television (HDTV). However, display 133 may be other types of devices presenting visual information, such as but not limited to, televisions, computer monitors, video monitors, touchscreen and/or tablet computing devices. Accordingly, a display 133 may optionally be equipped with an RF tuner, as in a television. Some embodiments are also compatible with tunerless displays and can provide audiovisual signals to the display in various analog and digital video formats (including for example composite, component, S-video, VGA, SDI, DVI, or HDMI) or as data formatted for delivery using a networking protocol, such as IP, or as other peripheral data communication protocols including USB.

The set-top box or set-back box (STB/SBB) 135 is commonly employed by various commercial network operators for in-premises service delivery. A STB/SBB may be used by the network operator as part of a conditional access system, and may contribute to other functionality such as access to multiple delivery methods and enhanced services, such as video on demand, video telephony, Internet access, electronic program guides, and IPTV. STB/SBB 135 may be used in conjunction with display 133 that is also serviced by module 200 or may service a separate or additional audiovisual device 133' as seen in FIG. 2.

Modem 230 (see FIG. 3) provides for two-way communication with the outside network(s) 100. For example, modem 230 may be compliant with the various versions of the Data Over Cable Service Interface Specification (DOCSIS), for example DOCSIS 3.0 or DOCSIS 3.1, or their variants, predecessors, and derivatives. Modem 230 may also be configured to operate in a various territories according to local signal standards, for example, in a particular embodiment, modem 230 may be a EuroDOCSIS 3.0-compliant modem. Additional modem types that can be implemented include DSL, fiber optic, and/or a networking port (such as an Ethernet socket) or can function as a network bridge between external networks(s) 100 and the internal premises network 110 or between different segments of a premises network. Modem 230 may also be equipped with additional functionality, such as upconversion and transcoding, as may be suitable to a particular installation. In some embodiments, modem 230 can be a wireless modem, so that module 200 acts as a wireless network extender (particularly when combined with WAP 170 or internal WAP 270 described herein) and/or provide wireless networking capabilities to an otherwise wired device, such as an attached audiovisual device.

Figure 3:
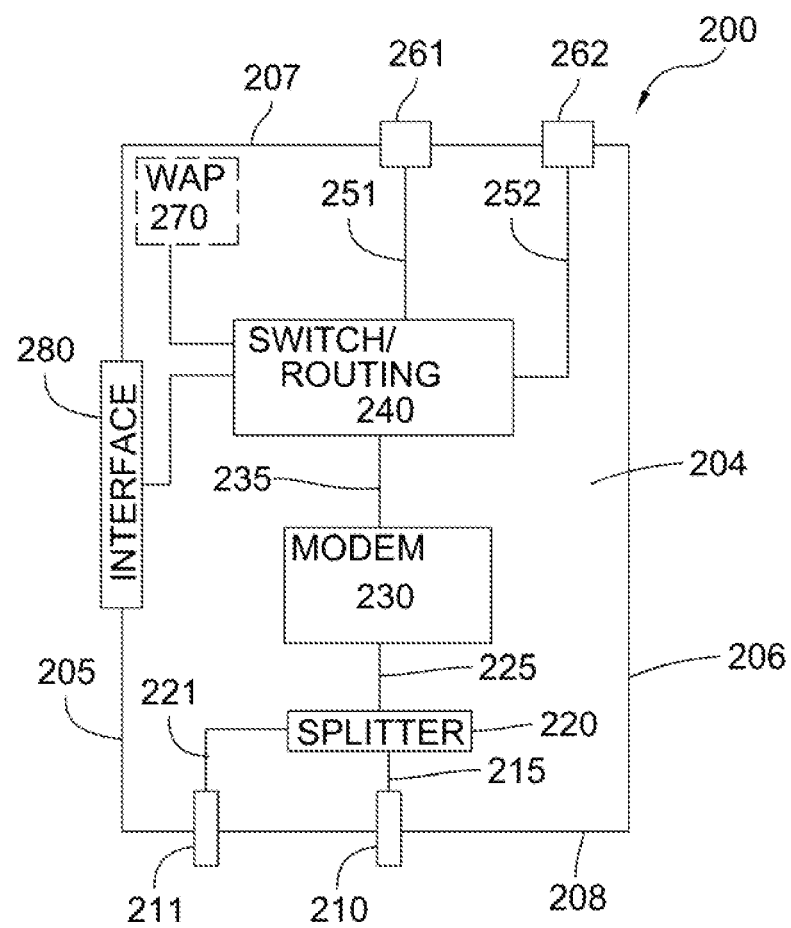
FIG. 3 is a top-down view of an inventive module of FIG. 2.

In FIGS. 2 and 3, routing function or switch 240 receives and sends data from modem 230 for, respectively, distribution within the premises network 110 and communications to the external network 100. Switch 240 can support multiple devices, for example, devices $150_1$ to $150_k$, where k may be, for example, 3, 5, 7, 10, or 20. Routing function 240 can handle general traffic (such as IP data from a networked device) as well as media streams with audiovisual content. Display 133 and/or STB/SBB 135 may be counted against the total k devices serviced by switch 240, but additionally or alternatively may be separately serviced by modem 230. For example, audiovisual data suitable for presentation on a display may be sent directly from modem 230 to a suitable interface or transmission medium without redirecting through switch routing functions 240.

As seen in FIG. 3, module 200 may be equipped with various components. The embodiment shown in FIG. 3 includes a housing formed from sides 205 and 206, front 207, and back 208, for example a metal or plastic electronics structure. Within the structure may be a substrate 204 such as a circuit board that mechanically supports and electrically connects the various components. The embodiment in FIG. 3 processes cable RF signals delivered over a coaxial network, but as described above, different signal types and interfaces can be implemented without departing from the scope of the disclosure. Input port 210 may be a coaxial connector which delivers an incoming signal to splitter 220. Splitter 220 delivers the input signal to both the modem 230 and to output port 211. Output port 211 may be a coaxial connector, which may then be wired to an audiovisual device, such as a coaxial cable input on a television. Various signal amplification or reduction methods may be implemented within the module 200 or as part of its various components. For example, as is known, splitter 220 may attenuate a signal so that paths 221 and 225 are approximately 4 dB less than input path 215. Additional components may amplify to correct for such signal loss, if necessary, for signal processing either within module 200 (e.g., for handling by modem 230) or as part of delivery to output port 211.

Although shown with a single input port 210 and single output port 211 in FIG. 3, multiple inputs and/or outputs are possible. For example, the module 200 may be connected to and have separate input ports 210 for both a cable system and an antenna to receive over-the-air broadcasts. Other examples could include inputs from a satellite broadcast, or a locally-generated content for insertion into or displacement of signals received through other media. Output port 211 can be duplicated to service additional audiovisual equipment, different parts of the same audiovisual equipment, and/or combinations thereof. Either the same or different content may be provided on each output port 211, and can be in the same or different output signal and cabling formats, according to particular embodiments and installation requirements. Embodiments include providing networking over coaxial cable (such as Ethernet over Coaxial (EoC) or Multimedia Over Coax Alliance (MOCA)) as well as systems that do not use coaxial cable at all, for instance in a fully IPTV system.

The modem 230 functions as described above, demodulating signals received from input 210 for delivery of data to switch 240 and also modulating data from switch 240 for delivery to external networks. Illustratively, delivery may be an RF signal at the module boundary but transmitted as packets (i.e., IP-based) among the modem, switch, and other networking components described herein. As illustrated in FIG. 3, input port 210 functions to both receive cable service from the cable network and as a medium for carrying modulated outbound signals from modem 230 to external networks.

Switch 240 routes data between various networked devices and, via the modem, the external network(s). Implementation options include using an integrated circuit for switch functions 240, although other processor types and combined hardware/software solutions would be available. Switch 240 is in communication with various other components of the module 200, optionally via electrical connections and/or wiring as part of substrate 204. For example, in FIG. 3, switch 240 is in communication with networking sockets 261 and 262 via paths 251 and 252, respectively. The number of external networking sockets may be greater or smaller than the two shown in FIG. 3, and they may be positioned on various sides of the module 200 as needed for a particular application. As part of switch functions 240 or other electronic components (not shown) in module 200, path 252 may be enhanced to also carry power or carry power along a parallel path. For example, path 252 and networking socket 252 may be configured to provide Power over Ethernet (PoE) in various standardized forms. Power may therefore be provided to an external device (not shown) via the network wiring, eliminating the need for additional power supply wiring relating to that device.

In some embodiments, the external device that receives power through socket 262 may be a wireless access point (WAP) or wireless router, although other devices, such as cameras, telephones, digital assistants, or home automation devices may be used. In some alternatives, WAP 270 is integrated into the module 200 and in communication with switch 240 as described above. By integrating or servicing either internal WAP 270 or an external WAP device, additional user devices may be connected to the network with minimal additional wiring. When implemented with an integrated WAP 270, module 200 may also include an optional antenna (not shown).

Switch 240 is also in communication with interface 280. Interface 280 may provide both a networking connection and a power supply connection with a complementary audiovisual device (display, STB/SBB, television, monitor, etc.). In one example, interface 280 may be a 60-pin connector adapted for mating with a STB/SBB expansion slot, where four pins provide an IP interface (e.g., 100 Mbps Ethernet support) while power is supplied over one or more additional pins. The remaining pins can be assigned to specific functions with direct or indirect wiring to other components such as, for example, a hardware reset for modem 230 or the entirety of module 200 or status polling or internal diagnostic communications. Other interface types may be used, such as, but not limited to, PCI, PCI Express, USB, ExpressCard, CardBus, other standardized bus interfaces and their derivatives, and custom interfaces for mating to particular hardware in the audiovisual device.

A feature of the disclosure is the supply of power from the audiovisual device to module 200. As illustrated, power is supplied through one or more conductors in interface 280. However, separate, distinct, or additional connections to the attached device may be dedicated to power delivery instead of or in addition to power received through interface 280. Within the module 200, power supplies can be modified to an appropriate form for delivery to other components or media. For example, power delivered to module 200 from an attached television could be 12V DC, while power from the module to an attached device (such as PoE to a wireless access point) could be in about the 30V to 60V range.

2. Module Formats for Use with Various Audiovisual Systems

FIGS. 4 to 7 illustrate non-limiting examples of various modules to enhance networking capabilities of audiovisual systems. FIG. 4A depicts a STB/SBB expansion module 200 with a layout similar to the schematic shown in FIG. 3. The STB/SBB 135 is shown with power supply input 190, RF input 191, networking port 192, and audiovisual ports 195. As seen in FIG. 4A, the module 200 may have an output 211 wired to the STB/SBB's input 191 with, for example, coaxial cable 121. The module 200 may, in turn, be connected to external networks through premises wiring 120 attached to its input port 210. In FIG. 4B, the module 200 is shown disconnected from the STB/SBB 135 of FIG. 4A.

Side 205 has an opening for interface 280 to connect to the STB/SBB. Input 210 and output 211 are shown as coaxial connectors. Socket 260, for example an Ethernet socket, is shown on rear 208, rather than the front as shown in FIG. 3, but may be located on any side or multiple sides. Moreover, socket 260 may be for a serial bus interface, such as USB, rather than a traditional networking socket, which may be configured to provide networking and/or IP-based connectivity over an alternative physical port format. Module 200 may also include indicators 213 visible on rear 208 (or other surfaces), such as light-emitting diodes (LEDs) to indicate the status of signals, internal components, and/or external ports.

Figure 5:
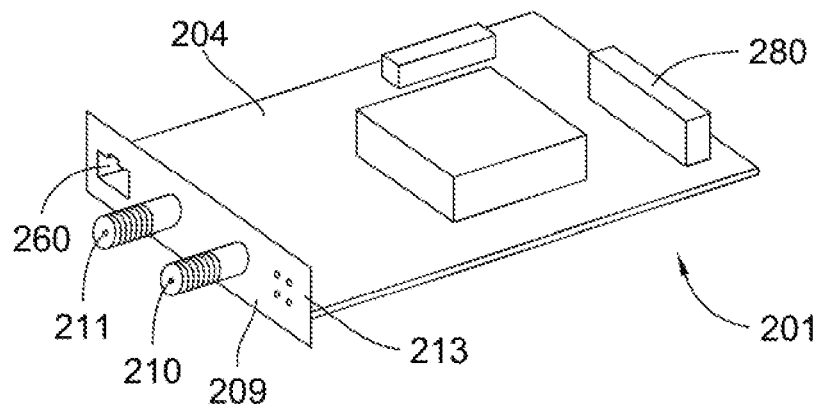
FIG. 5 is a perspective view of an inventive module of FIG. 2 configured for insertion into a set-top or set-back box.

In FIG. 5, module 201 is configured to slide into an expansion slot an audiovisual device (not shown), such as a STB/SBB. In this embodiment, substrate 204 attaches to a plate or cover 209 that, after installation in a STB/SBB, is the only exposed surface. The illustrated embodiment is slid into an opening in the back of the STB/SBB. As shown, interface 280 is located at a distal end of the substrate 204, although other locations and orientations can implemented according to particular installation needs. As with module 200, in module 201, input 210, output 211, indicators 213, and networking socket 260 are accessible on plate 209. Disclosed embodiments include multiple networking sockets 260 of one or more types and kinds. Additionally, the STB/SBB may include one or more networking ports separate from the module 201, which, upon installation of the module, are serviced with connectivity and modem functions of the module 201 through interface 280.

Figure 6:
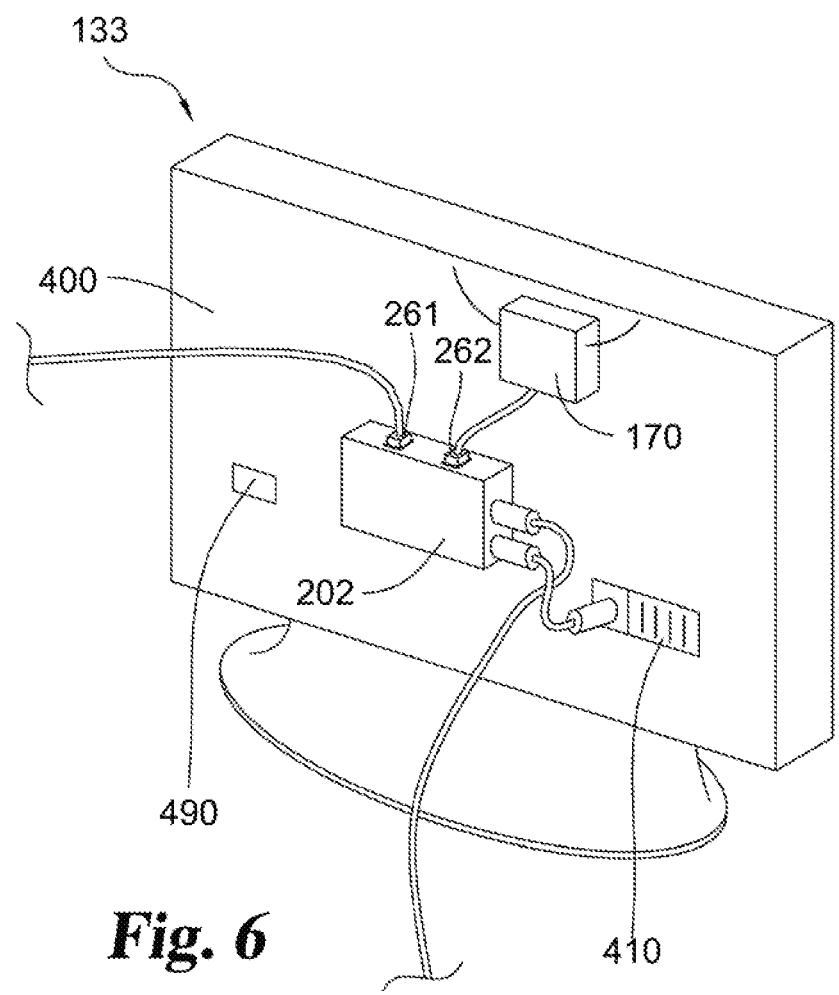
FIG. 6 is a perspective view of an inventive module of FIG. 2 installed onto a display device.

In FIG. 6, a display-mounted module 202 is shown. Module 202 may have all of the same functionalities as modules 200 and 201 described above. However, here module 202 is attached directly to the back of an audiovisual display device. For example, the 60-pin connector described above (in FIG. 5) as an interface 280 may be positioned and oriented to extend below or behind the substrate 204 in FIG. 5 and into an opening in the display 400 of FIG. 6. Typically, such a mounting will be on the back of the display enclosure or housing, opposite the screen. Display 400 has audiovisual ports 410, such as coaxial, analog video, digital video, and/or audio and video outputs, which may be connected to module 202. Although shown as connected to the module 202 using external cabling, a display-mounted module may also provide audiovisual content, data, and/or signals over interface 280 in FIG. 5 in place or as a supplement to that provided from the module output to the display audiovisual ports 410. Also of note in FIG. 6, display 400 has power input 490, while the module 202 is not supplied with its own power supply. Instead, interface 280 in FIG. 5 receives D.C. power from the display 400. Power from the display 400 can be converted to an appropriate form to power an external device, as previously described, such as wireless access point 170 shown here. The wireless access point 170 connects to one of the networking sockets 262 while a wired network connection connects to another networking socket 261.

In a variation (not shown), a module can be implemented to convert IPTV delivery services to a traditional distribution mode, such as coaxial RF, and thereby provide backward-compatibility to display devices. In an IPTV distribution system, television programming is delivered over networks based on an IP format. An inventive module, for example, may include many of the features illustrated in FIG. 3 but omit splitter 220. Instead, the module receives IP-based programming either through modem 230 or through switch 240 via a networking port. The modem, switch, or other components of the module are configured to convert IPTV programming to transport streams suitable for a traditional television input (such as QAM or VSB modulation). The modem can then modulate the television programming for delivery over a traditional legacy medium, such as coaxial cable, to an associated audiovisual device. The output path may be distinct from all input paths to the modem. Thus, audiovisual devices with limited input formats can be transitioned into a IP-based delivery system.

In a further embodiment (not shown), an inventive module can be implemented within and integrated with a display unit, such as a television. A routing function, router, or switch can be included in the module and integrated display unit. The display device can further include an integrated wireless access point in communication with the switch and modem, as previously described. Thus, network access can be provided in the vicinity of the display unit with minimal and/or no interconnected wiring between devices. Further components may be integrated into the all-in-one display unit. For example, a mass storage device, hard drive, or digital video recorder (DVR) may be integrated into the device. The display unit may also be equipped with a processor providing advanced functionalities for user access and input, such as commercially available "smart" televisions. The display unit may also lack an RF tuner and be designed for an entirely IP-based content delivery system.

An advantage provided throughout the disclosure is the elimination or reduction of external wiring that is subject to alteration, misconfiguration, or mutilation by users. A further advantage is the capacity of using existing facility wiring to provide a variety of service types to multiple user devices from one integrated device, without the need to run additional wiring (such as, for example, Ethernet) to retrofit facilities. Integration of power supplies further reduces external wiring necessary to provide the various services of the integrated device. For example, in an embodiment integrating a display, cable modem, and router, a single power supply unit with an AC input (similar to power input 490 in FIG. 6) may convert to DC power outputs supplying power to each of the display, cable modem, and router.

Figure 7:
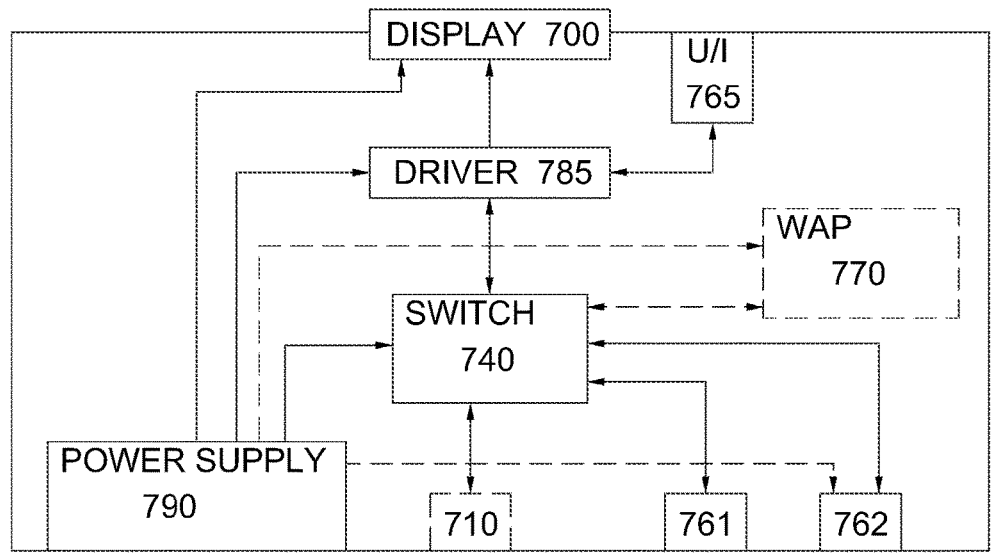
FIG. 7 is a functional diagram of an embodiment of an inventive integrated audiovisual networking device.

In FIG. 7, an embodiment includes an integrated audiovisual networking device with an integrated display 700 and switch 740. A distinct modem may be omitted from this system. Instead, in a premises setting with network connectivity, the external network(s) can be extended through switch 740 to the display 700 and additional devices. For example, the device may include an input port, such as illustrated networking socket 710 (e.g., Ethernet port) that can be connected to the premises network through conventional wiring (e.g., CAT5). Optionally, display 700 can be equipped with a processor, operating system, and memory that operate as a driver 785 for the display 700. Again, an example of such technology is a commercially available "smart" TV or monitor. The driver 785 receives input from user interfaces 765, such as a remote control, microphone, or buttons mounted on the device. Driver 785 controls the presentation on display 700 in response to user input, sends requests through switch 740, and receives content from switch 740. Optionally, display may include a television tuner (e.g., RF input), and driver 785 can select between content received from switch 740 and programming received through the television tuner for presentation on display 700. Switch 740 may provide additional network connectivity to output ports 761 and 762. As before, output port may be configured to provide power to an external device, including a WAP, and the different output ports may be configured differently, such as different power levels, different physical socket formats, or different transmission formats and protocols. A WAP 770 may also be integrated into the audiovisual device, such that the network access is provided through switch 740 to various additional wireless devices in the premises. Single power supply 790 can supply power to the various components within the device, including the conversion from external AC power to DC power appropriate for each of the display, driver, and switch, respectively. Single power supply 790 can also supply optional integrated WAP 770 and/or an external device through a port, such as is illustrated in FIG. 7 with port 762.

3. Networking Options, Security, and Configuration

Module 200 may be configured to isolate traffic to and from the various networked devices. The modem and switch may provide firewalled data partitioning among the different isolated ports within the network, such as logical VLAN partitioning. Data partitioning has several benefits, including enhanced security (e.g., isolating external user traffic from control processes and settings, or restricting content to authorized limits) and lowering the data rate required for the switch to service any given networked device. Security domains can be managed in various protocols and formats, for example as VLAN tags, unique service flow identifiers (SFID), 802.1q, multiprotocol label switching (MPLS), or tunneling including IPSEC/GRE layer 2 or layer 3 tunnels. Thus, each port or device serviced by the module may be bound to a separate security domain even though serviced by one common physical connection or path to external network(s).

Figure 8:
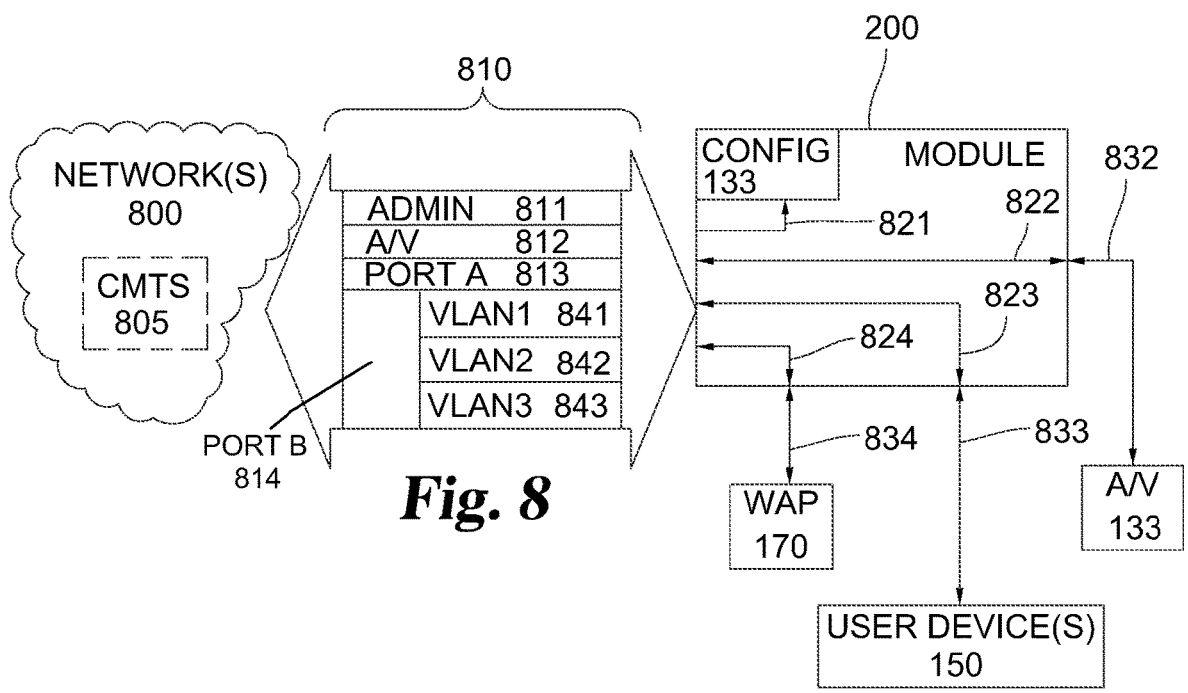
FIG. 8 is a diagram of traffic partitioning and handling in an inventive module such as that of FIG. 2.

For example, in FIG. 8, four distinct primary security domains are shown as associated with a module 200, one of which has three secondary security domains nested within it. Network(s) 800 send traffic 810 to the module 200, optionally with additional processing through cable modem termination system (CMTS) 805 or other network interface device as will be further explained below. In this example, administrative or management traffic is isolated on partition 811, audiovisual content destined for an associated audiovisual device 133 is isolated on partition 812, traffic for a first networking port ("Port A") is isolated on partition 813, and traffic for a second networking port ("Port B") is isolated. It will be appreciated that more or fewer partitions and/or subpartitions can be used as needed to service various configurations of inventive modules. Multiple groups of secondary security domains can be used, and one could even nest another layer of security domains within a security domain that is itself is nested in a primary security domain. In this illustration, the module 200 transfers the isolated partitions 811, 812, 813, and 814 (including the nested secondary security domains VLAN1 841, VLAN2 842, and VLAN3 843) along logical paths 821, 822, 823, and 824, respectively. Although shown as separate paths 821, 822, 823, and 824, the logical paths may share physical and/or electrical paths while maintaining the logical partitioning, for example, by having one coaxial connection to the external network(s).

Within module 200, security partitioning can be maintained in the same protocol or format as in traffic 810, or may be converted to a different isolation scheme. For example, partitions 811, 812, 813, and 814 may have VLAN tagging, while paths 821, 822, 823, and 824 use SFID tagging. In an optional alternative, a CMTS 805 can convert different tagging schemes and protocols associated with the traffic 810, such as the described VLAN-to-SFID conversion. A configuration file 831 internal to the module 200 may be delivered through administrative traffic 811 and 821. In an alternative (not shown), configuration file 831 can also be installed via a locally-connected device through a networking port. Configuration file 831 may determine the mapping to be applied to the different data partitions.

Other traffic routed through the module, such as traffic on paths 822, 823, and 824, may be delivered as output signals 832, 833, and 834, respectively. Signals 832, 833, and 834 may be in any of the various formats that have been previously described in connection with FIGS. 1-7. In FIG. 8, traffic 833 is a partition dedicated to serving a wired user network device 150, for example a desktop computer, while traffic 834 is a partition dedicated to servicing a WAP 170. The WAP 170 may, in turn, service various additional devices, and may optionally employ its own security and authentication protocols which may differ from the traffic handling within module 200.

Traffic flowing in the other direction (toward external network(s) 800) can be similarly isolated. For example, traffic packets received from connected devices through signals 832, 833, and 834 will be untagged. Module 200 can apply tagging to differentiate the sources of the various packets and maintain isolation of data as the packets are relayed, for example by using SFID tagging. Upon transmission outward through traffic 810, partitions 811, 812, 813, 814 will remain partitioned and isolate the packets that were provided from the distinct paths 821, 822, 832, and 834, although, as described above, the partitioning/tagging protocol or format can be modified within module 200 or optionally at a CMTS 805.

Data partitioning can also be nested to further isolate device-specific traffic in a network. For example, multiple modules 200 can be used within a commonly-managed facility to service different areas. One example is a hotel, with modules installed in association with each of the guest rooms, as well as common areas, dining facilities, etc., that are managed by one operator. Local operator equipment (such as a CMTS) may create SFIDs applicable to each modem module in the operator-managed network. Each SFID may, in turn, contain VLAN-tagged packets, whereby the module can route VLAN-tagged traffic to multiple ports according to the VLAN availability of the different ports and its configuration file(s). Alternatively, SFIDs may be defined to map to the specific ports of a given module. Although described in this example with nested SFID and VLAN tagging schemes, various of the other tagging protocols can be nested to create additional virtual networks within an outer partitioning. As examples, 802.1q may be nested within MPLS, 802.1q may be nested within 802.1q, or MPLS nested within SFID.

The invention claimed is:
1. A system, comprising:
a display;
a module in communication with external networks, the module partitioning network traffic between audiovisual data addressed to the display and networking data addressed to one or more additional devices, wherein the module comprises a separable housing connected to the display through an interface which supplies power from the display to the module;
wherein the audiovisual data and networking data are received from external networks using the same path;
wherein the module comprises a cable modem adapted to communicate with external networks using RF signals over a coaxial delivery system.
2. The system of claim 1, comprising:
a wireless access point connected to the module;

wherein the module partitions network traffic between audiovisual data addressed to the display, networking data addressed to one or more additional devices, and WAP data addressed to the wireless access point.

3. The system of claim 2, wherein the display is a television.

4. The system of claim 3, wherein the module comprises a wireless modem module in communication with external networks.

5. The system of claim 1, wherein the display is a television.

6. The system of claim 5, wherein the module comprises a splitter which delivers an input signal to both the cable modem and an output port connected to the television by a coaxial cable.

7. The system of claim 1, comprising:
a configuration file stored by the module;
wherein the module associates a label for each of the partitioned data based on information in the configuration file.

8. The system of claim 7 wherein the module provides both primary partitions isolated from one another and secondary partitions nested within one of said primary partitions wherein said secondary partitions are isolated from one another.

9. The system of claim 7, wherein the label for each of the partitioned data is a VLAN tag.

10. The system of claim 7, wherein the label for each of the partitioned data is a SFID tag.

11. The system of claim 7, wherein the label for each of the partitioned data is an 802.1q tag.

12. The system of claim 1, wherein network traffic received by the module is in a first isolation format, wherein the module converts the network traffic from the first isolation format to a second isolation format.

13. The system of claim 1, wherein the module comprises a networking port.

14. The system of claim 13, wherein the module is adapted to convert power from the interface to a different form and supply the converted power to the networking port.

15. The system of claim 14, comprising a wireless access device in communication with and powered by the networking port.

16. The system of claim 13, wherein the networking port includes a universal serial bus (USB) interface.

17. The system of claim 1, wherein the module comprises a separate input port for receiving content independent of the audiovisual data received from external networks through the cable modem.

18. The system of claim 17, wherein the separate input port receives over-the-air broadcasts through an antenna.

19. The system of claim 13, wherein the module partitions network traffic between audiovisual data addressed to the display, networking data received through the cable modem, and networking data received through the networking port.

20. The system of claim 1, wherein the module partitions outbound network traffic communicated to external networks through the cable modem based on the source device associated with each packet of such outbound network traffic.

* * * * *